United States Patent [19]

Mutoh et al.

[11] Patent Number: 4,599,549
[45] Date of Patent: Jul. 8, 1986

[54] METHOD AND APPARATUS FOR CONTROLLING PWM INVERTERS

[75] Inventors: Nobuyoshi Mutoh, Hitachi; Keijiro Sakai, Hitachiota; Akiteru Ueda, Ibaraki; Akira Ishibashi, Tokyo; Ikuo Okajima, Yachiyo, all of Japan

[73] Assignee: Hitachi, Ltd., Tokyo, Japan

[21] Appl. No.: 723,646

[22] Filed: Apr. 16, 1985

[30] Foreign Application Priority Data

Apr. 16, 1984 [JP] Japan .................................. 59-74984
Sep. 14, 1984 [JP] Japan .................................. 59-191608

[51] Int. Cl.⁴ ............................................... H02P 5/40
[52] U.S. Cl. ..................... 318/798; 318/806; 318/811
[58] Field of Search ......................... 318/803, 807–811, 318/729, 702, 798, 806

[56] References Cited

U.S. PATENT DOCUMENTS

| | | | |
|---|---|---|---|
| 3,753,063 | 8/1973 | Graf | 318/806 |
| 3,800,199 | 3/1974 | Weigand | 318/701 |
| 3,935,518 | 6/1976 | Yatsuk et al. | 318/805 |
| 4,186,334 | 1/1980 | Harata | 318/811 |
| 4,322,671 | 3/1982 | Kawada et al. | 318/811 |
| 4,420,718 | 12/1983 | Sakai et al. | 318/729 |
| 4,437,050 | 3/1984 | Overzet | 318/803 |

Primary Examiner—David Smith, Jr.
Attorney, Agent, or Firm—Antonelli, Terry & Wands

[57] ABSTRACT

An AC motor such as an induction motor or a synchronous motor is driven by a PWM inverter circuit. Power switching elements of the inverter circuit are ignited by PWM pulses resulting from comparison of a carrier wave signal with a sine wave modulation signal at a frequency proportional to a frequency setting signal so as to control the inverter circuit. A current polarity detector detects positive and negative components of a DC current flowing in the input side of the inverter circuit. The frequency setting signal is so corrected as to be decreased when only the positive current component flows in excess of one period of the carrier wave signal or increased when only the negative current component flows in excess of the one period.

10 Claims, 13 Drawing Figures

METHOD AND APPARATUS FOR CONTROLLING PWM INVERTERS

BACKGROUND OF THE INVENTION

This invention relates to a method and an apparatus for controlling PWM (pulse width modulation) inverters used for driving an AC motor such as an induction motor and particularly to PWM inverter control method and apparatus directed to suppress oscillations of the AC motor caused when the AC motor is driven at varying speeds under a constant voltage/frequency ratio.

When the PWM inverters are used to drive the induction motor, open loop control is generally employed to make the voltage/frequency ratio constant. In an induction motor with a comparatively low moment of inertia, an unstable phenomenon responsible for occurrence of abnormal oscillations takes place when the induction motor is driven at frequencies, for example, 10 to 30 Hz which are lower than a rated frequency under a low load conduction which ranges from no load to about 10 to 20% loading.

A known method for suppressing the abnormal oscillations of the motor due to the unstable phenomenon is described in U.S. Pat. No. 3,800,199 (corresponding to Japanese Patent Publication No. 27807/78). According to this known method, a signal tuned to an oscillation frequency band of the rotor is extracted from a power amount supplied to the motor and detected through a band-pass filter, and the primary frequency is corrected by the tuned signal to suppress the oscillations.

The funed signal, however, changes with capacity of the motor and even for motors of the same capacity, it changes with the number of poles of the motor and the magnitude of load on the motor. Therefore, there needs a practically unacceptable setting of constants of the band-pass filter for one motor to another. In addition, when motor loading deviates from a design load, stability is disturbed. For these reasons, the known method fails to have applicability to general-purpose inverters for driving unspecified motors.

SUMMARY OF THE INVENTION

This invention contemplates elimination of the aforementioned drawbacks and has for its object to provide a control method and an apparatus for suppression of oscillations of an AC motor which can sufficiently stabilize motor driving irrespective of types of the motor and conditions of loading on the motor.

According to this invention, an in-flow DC current to a PWM inverter is defined as a positive DC current and an out-flow DC current from the PWM inverter to a DC power supply is defined as a negative DC current, and the output frequency of the PWM inverter (the primary frequency of a motor) is corrected when the DC current flows in only one direction over an interval of time which exceeds one period of a carrier wave signal used for production of PWM pulses. Specifically, the correction is such that when only the negative DC current flows over an interval of time exceeding one period of the carrier wave signal, the primary frequency is increased to instantaneously increase power supplied to the motor and when only the positive DC current flows over an interval of time exceeding the one period of the carrier wave signal, the primary frequency is decreased to instantaneously decrease the supply of power to the motor.

DESCRIPTION OF THE PREFERRED EMBODIMENTS

Figure 1:
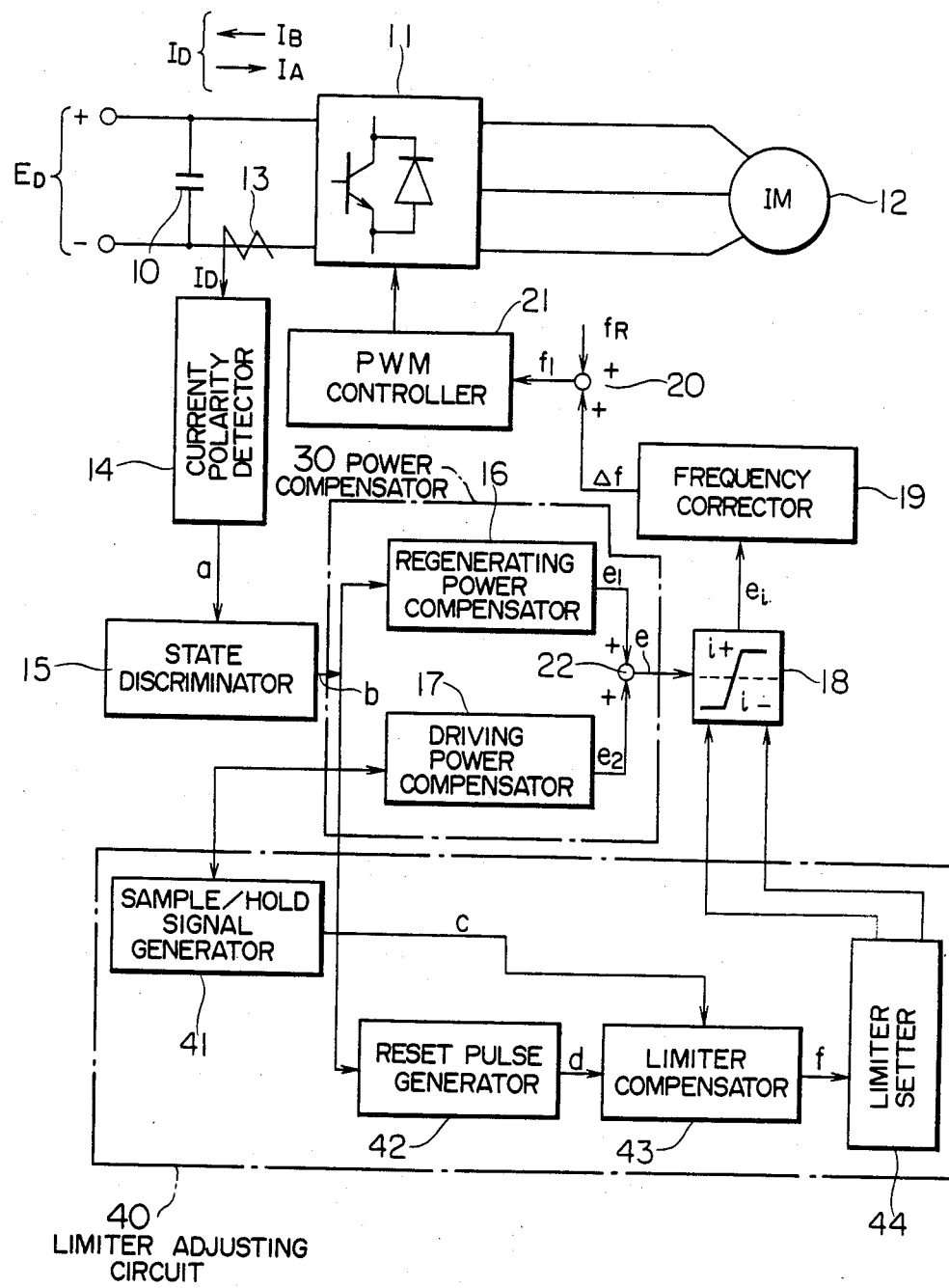
FIG. 1 is a block diagram showing the construction of a control apparatus according to an embodiment of the invention.
Figure 2:
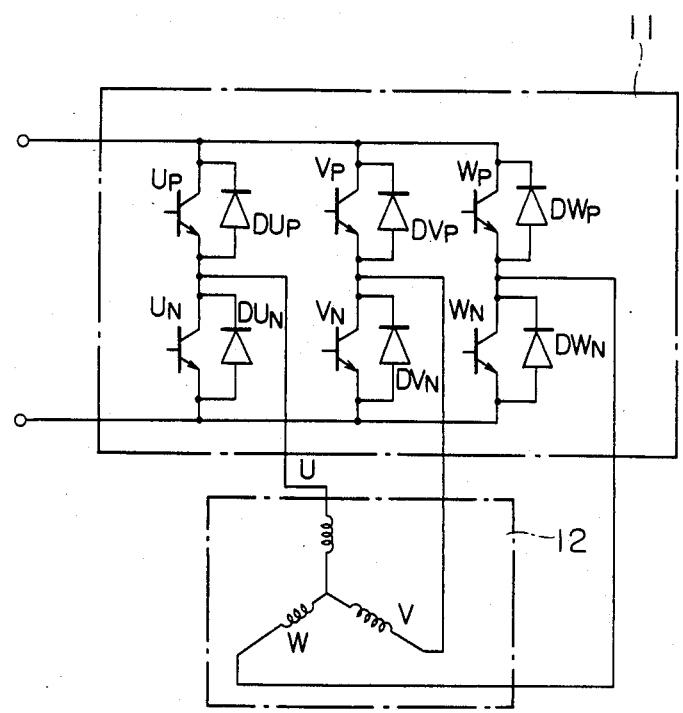
FIG. 2 is a circuit diagram of a PWM inverter circuit used in FIG. 1.

Referring now to FIG. 1, a control apparatus embodying the invention is schematically illustrated. In FIG. 1, a DC voltage $E_D$ from a DC power supply (not shown) is smoothed by a smoothing capacitor 10 and supplied to a PWM inverter circuit 11. The PWM inverter circuit 11 is adapted to convert the DC voltage into three-phase variable AC voltages of variable frequencies. An induction motor 12 is driven by the PWM inverter circuit 11. As shown in FIG. 2, the PWM inverter circuit 11 has three PWM inverters for three phases. A first PWM inverter includes a transistor $U_P$ connected with a circulating diode $DU_P$ in anti-parallel relationship and a transistor $U_N$ also connected with an anti-parallel circulating diode $DU_N$, a second PWM inverter includes a transistor $V_P$ connected with an anti-parallel circulating diode $DV_P$ and a transistor $V_N$ connected with an anti-parallel circulating diode $DV_N$, and a third PWM inverter includes a transistor $W_P$ connected with an anti-parallel circulating diode $DW_P$ and a transistor $W_N$ connected with an anti-parallel circulating diode $DW_N$. A DC current $I_D$ flowing through the PWM inverter circuit 11 is detected by a current transformer 13 and then supplied to a current polarity detector 14. The current polarity detector 14 detects a positive DC current when the DC current $I_D$ flows into the inverter circuit 11 in a direction $I_A$ and a negative DC current when the DC current $I_D$ flows out of the inverter circuit 11 in a direction $I_B$. A current polarity detection signal a delivered out of the current polarity detector 14 is supplied to a state discriminator 15. The state discriminator 15 generates a state discrimination signal b which assumes a high level when the negative DC current flows within a predetermined period and which assumes a low level when only the positive DC current flows. The predetermined period is determined by a frequency of a carrier wave which is compared with a modulation wave to generate PWM pulses applied to the PWM inverter circuit 11. The state discrimination signal b is fed to a regenerating power compensator 16 and a driving power compensator 17, both the compensators constituting a power compensator means 30. The regenerating power compensator 16 generates, in synchronism with the rise of the state discrimination signal b, a regenerating compensation signal $e_1$ which rises with a predetermined time constant. The driving power compensator 17 generates, in synchronism with the fall of the state discrimination signal b, a driving power compensation signal $e_2$ which rises with a predetermined time constant.

Figure 3:
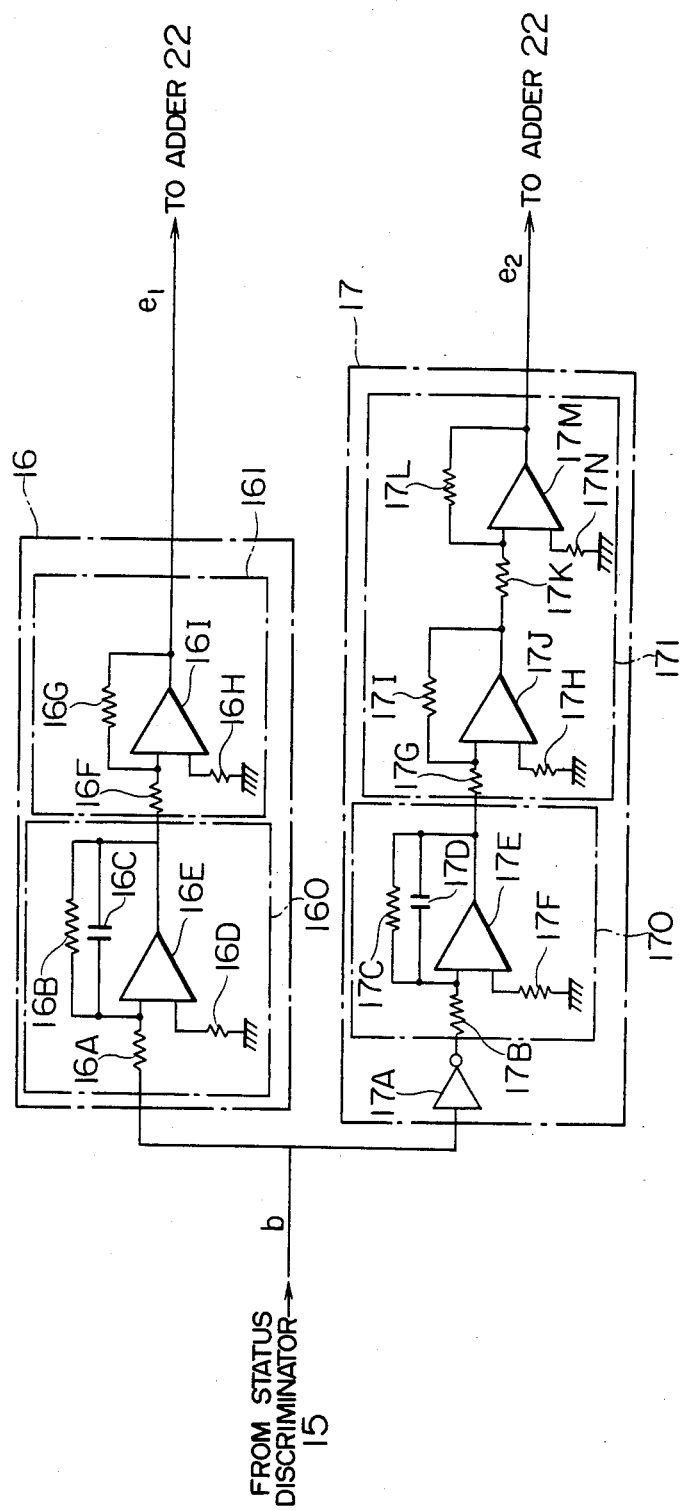
FIG. 3 is a circuit diagram of a power compensator in FIG. 1.

FIG. 3 shows an example of a circuit of the regenerating power compensator 16 and driving power compensator 17.

Referring to FIG. 3, the regenerating power compensator 16 comprises an integrator 160 for integrating the state discrimination signal b, and an inverting amplifier 161 for inverting and amplifying an integrated output signal of the integrator 160. The integrator 160 includes resistors 16A, 16B and 16D, a capacitor 16C and an operational amplifier 16E. The inverting amplifier 161 includes resistors 16F, 16G and 16H, and an operational amplifier 16I. On the other hand, the driving power compensator 17 includes an inverter 17A for inverting the state discrimination signal b, an integrator 170 for integrating an inverted state discrimination signal, and a non-inverting amplifier 171 for amplifying an integrated output signal of the integrator 170. The integrator 170 includes resistors 17B, 17C and 17F, a capacitor 17D, and an operational amplifier 17E. The non-inverting amplifier 171 includes a first inverting amplifier comprised of resistors 17G, 17I and 17H and an operational amplifier 17J, and a second inverting amplifier connected in series with the first inverting amplifier and comprised of a resistors 17K, 17L and 17N and an operational amplifier 17M.

Figure 4:
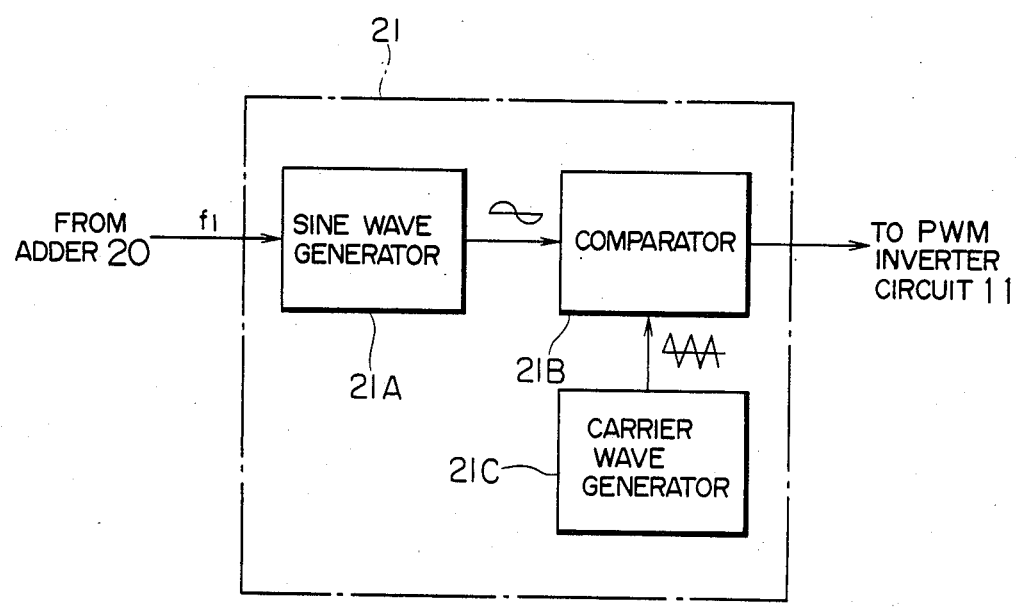
FIG. 4 is a schematic block diagram of a PWM controller in FIG. 1.

Returning to FIG. 1, the compensation signals $e_1$ and $e_2$ from the two compensators 16 and 17 are added together at an adder 22 to produce a compensation signal e which in turn is fed to a limiter 18. A limited compensation signal $e_l$ from the limiter 18 is fed to a frequency corrector 19. The frequency corrector 19 multiplies the compensation signal $e_l$ with a preset gain to produce a frequency correction signal $\Delta f$. An adder 20 adds the frequency correction signal $\Delta f$ with a frequency setting signal $f_R$ to produce a frequency command signal $f_1$ which in turn is fed to a PWM controller 21. As shown in FIG. 4, the PWM controller 21 comprises a sine wave generator 21A for generating a sine wave signal (modulation wave) at a frequency proportional to the frequency command signal $f_1$, a carrier wave generator 21C for generating a triangular wave signal (carrier wave), and a comparator 21B for comparing the modulation wave with the carrier wave. PWM pulses generated from the PWM controller 21 are applied to the PWM inverter circuit 11. On the other hand, the state discrimination signal b of the state discriminator 15 is also fed to a limiter adjusting circuit 40.

The limiter adjusting circuit 40 comprises a sample/hold signal generator 41, a reset pulse generator 42, a limiter compensator 43, and a limiter setter 44 for generating positive and negative symmetrical limit values $i_+$ and $i_-$ which are proportional to a limiter setting signal delivered out of the limiter compensator 43. In order to stabilize motor driving even when the frequency for the inverter circuit 11, it is necessary to adjust the upper and lower limit values $i_+$ and $i_-$ of the limiter 18 in accordance with the period of the state discrimination signal b, and the limiter adjusting circuit 40 is provided for this purpose.

The operation of the control apparatus will now be described.

To facilitate understanding of the invention, an explanation will first be given of the operation of the apparatus which is not oscillatory.

The PWM controller 21 supplies the frequency command signal $f_1$ to the sine wave generator 21A. The sine wave generator 21A then generates a sine wave signal at a frequency $f_1$ which in turn is fed to the comparator 21B. The comparator 21B, also fed with a triangular wave signal generated from the triangular wave generator 21C, compares the sine wave signal with the triangular wave signal to produce PWM pulses. The thus obtained PWM pulses are applied to the inverter circuit 11.

Figure 5:
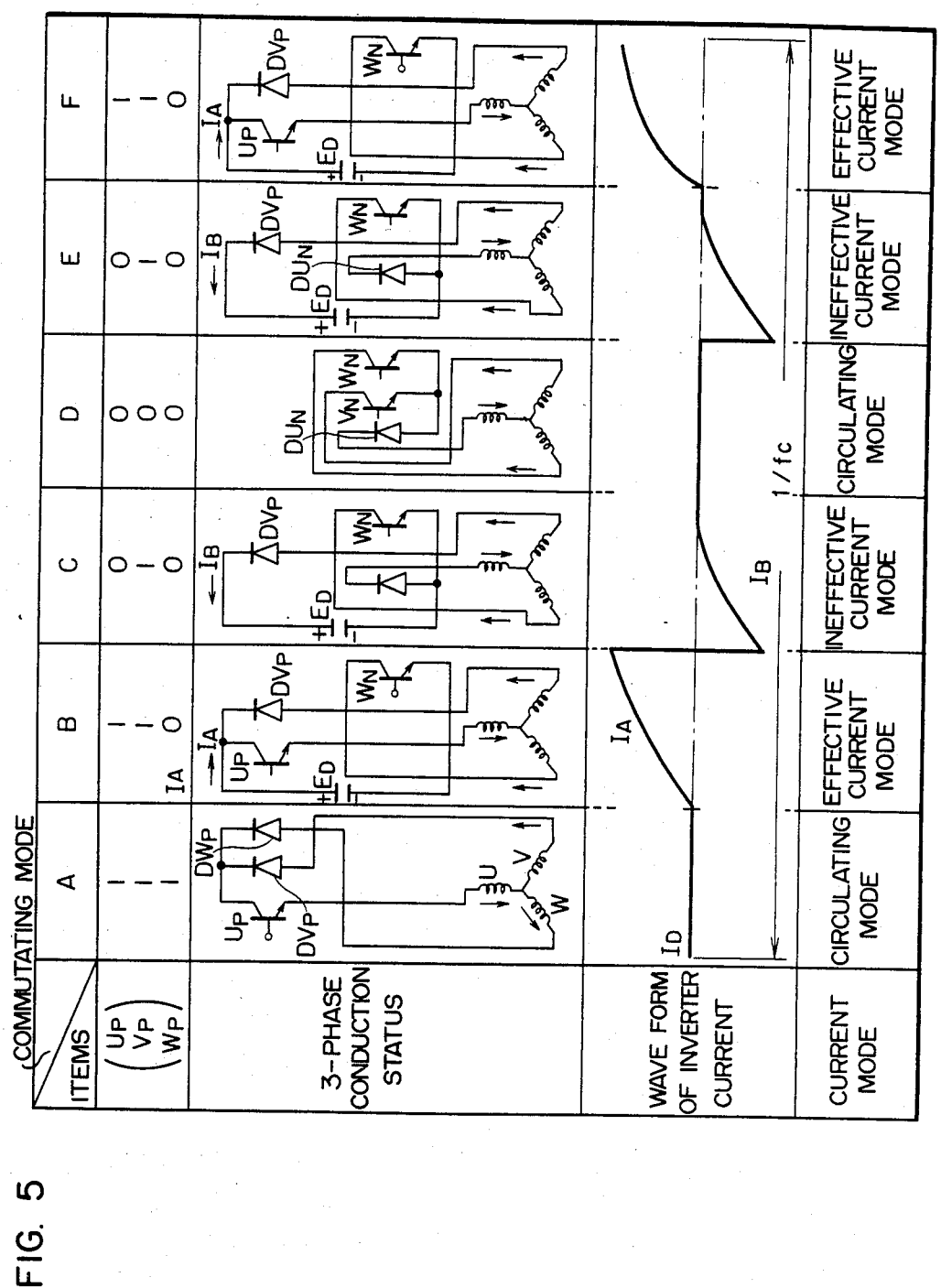
FIG. 5 is a diagrammatic representation illustrating various commutating modes of a PWM inverter.

When three-phase PWM signals $U_P'$, $V_P'$ and $W_P'$ are applied to the PWM inverter circuit 11 under no load condition, the inverters are commutated in various modes as shown in FIG. 5 to provide various currents flowing in the inverter circuit, taking waveforms as shown in FIG. 5 over one period of the carrier wave which is $1/f_c$ where $f_c$ is the frequency of the carrier wave.

In FIG. 5, "1" represents a status wherein the three-phase PWM signals are applied to the respective transistors $U_P$, $V_P$ and $W_P$ on the positive side and are not applied to the respective transistors $U_N$, $V_N$ AND $W_N$ on the negative side. Denoted by "0" is a reverse status. In a commutating mode A, all the three-phase PWM signals are applied to the transistors $U_P$, $V_P$ and $W_P$ on the positive side, and a current flows in the PWM inverter circuit 11 through the diodes $DV_P$ and $DW_P$ and the transistor $U_P$. In this mode A, there is no in-flow or out-flow DC current $I_D$ to or from the inverter circuits 11 and the mode A is called a circulating mode. As the PWM signals change from the mode A (1, 1, 1) to a mode B (1, 1, 0) where the PWM signal $W_P'$ for W phase changes from "1" to "0", a DC current from the positive pole of DC power supply $E_P$ (corresponding to capacitor 10 in FIG. 1) flows into a U-phase winding of the motor 12 via the transistor $U_D$ and flows out of a W-phase winding to the negative pole of the DC power supply $E_D$ via the transistor $W_N$. In the mode B, a positive DC current $I_A$, which flows from the DC power supply $E_D$ to the motor 12, flows in the inverter circuit 11, and this mode B is called an effective current mode.

Subsequently, as the mode B (1, 1, 0) changes to a mode C (0, 1, 0) where a U-phase PWM signal $U_P'$ changes from "1" to "0", a DC current flows from a V-phase winding of the motor 12 to the positive pole of the DC power supply $E_D$ via the diode $DV_P$, so that a negative DC current $I_B$ flows in the inverter circuit 11 in the commutating mode C. This mode C is called an ineffective current mode.

The mode C changes to a mode D (0, 0, 0) where a V-phase PWM signal $V_P'$ changes from "1" to "0". In this mode D, a current from the V-phase winding of the motor 12 flows into the U-phase winding through the transistor $V_N$, W-phase winding of the motor 12, transistor $W_N$ and diode $DU_N$, so as to circulate through the V-phase, W-phase and U-phase windings of the motor 12. As a result, there is no in-flow or out-flow DC current $I_D$ to or from the inverter circuit 11, and the mode D is also called a circulating mode like the mode A.

As a mode E is reached wherein the PWM signal $V_P'$ changes from "0" to "1", a DC current flows from the V-phase winding to the positive pole of the DC power supply $E_D$ via the diode $DV_P$, so that a negative DC current $I_B$ flows in the inverter circuit 11 in this mode E as in the mode C. Subsequently, as the mode E changes to a mode F where the U-phase PWM signal $U_P'$ changes from "0" to "1", a DC current $I_D$ from the positive pole of the DC power supply $E_D$ flows into the U-phase winding via the transistor $U_P$ and returns to the negative pole of the DC power supply $E_D$ via the W-phase winding and transistor $W_N$. Thus, in the mode F, a positive DC current $I_A$ flows in the inverter circuit 11 as in the mode B.

When examining the DC current $I_D$ flowing in the inverter circuit 11 during the period of the carrier wave, it will be seen from the above operation that the positive DC current $I_A$ and the negative DC current $I_B$ flow in predetermined sequence in accordance with the PWM signals. More particularly, the positive DC current $I_A$ or the negative DC current $I_B$ flows over an interval of time which, depending on the load on the motor 12, ranges from half the period, equalling $\frac{1}{2}f_c$, to one period, equalling $1/f_c$, of the carrier wave. The motor 12 can rotate stably when the positive DC current $I_A$ which is larger than the negative DC current $I_B$ flows over the time interval because under this condition, necessary power for the rotation of the motor 12 can be supplied constantly from the PWM inverter circuit 11.

Figure 6:
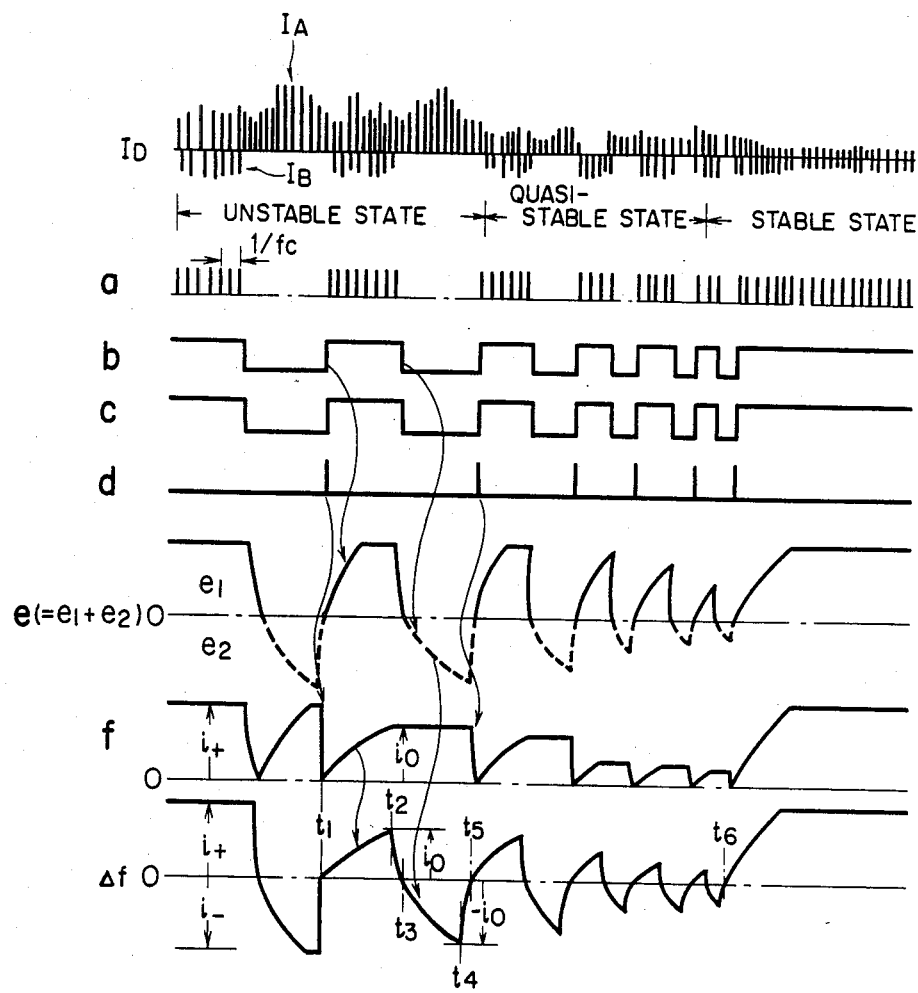
FIG. 6 is a time chart useful in explaining the operation of the apparatus according to the invention.

Referring now to a time chart of FIG. 6, an oscillation phenomenon and an operation for suppressing it will be described.

In an unstable state where oscillations occur, the DC current $I_D$ alternately repeats one status in which the flow of the positive DC current $I_A$ is predominant and the other status in which the flow of the negative DC current $I_B$ is predominant. Here, the former oscillatory status is defined as a driving status and the latter oscillatory status is defined as a regenerating status. Each status continues for an interval of time which is larger than one period of the carrier wave.

According to the invention, either of the predominant flow of the positive DC current $I_A$ resulting in an oscillatory state and the predominant flow of the negative DC current $I_B$ also resulting in an oscillatory state is judged in advance of the occurrence of the oscillatory state by using the state discrimination signal b, in order to correct the frequency command signal for the PWM inverter circuit so that either of the positive current component $I_A$ and the negative current component $I_B$ of the DC current flowing in the inverter circuit may flow at a predetermined period. Occurrence or disappearance of the oscillatory state can be judged as will be described below. The DC current $I_D$ of the inverter circuit 11 is first detected by the current transformer 13 and supplied to the current polarity detector 14. When the negative current $I_B$ flows, the current polarity detector 14 detects the negative polarity and produces the current polarity signal a in the form of pulses indicative of logic during the detection of the negative polarity. The state discriminator 15 produces the state discrimination signal b which assumes the high level when the negative current $I_B$ flows at a given period and which assumes the low level for an interval of time during which only the positive current $I_A$ flows. The state discrimination signal b delivered out of the state discriminator 15 is illustrated in FIG. 6. The occurrence of the oscillatory state can be judged from the state discrimination signal b. At a time point at which the state discrimination signal b changes from low to high, the negative current $I_B$ begins to flow predominantly, indicating that the regenerating status begins to take place. At a time point at which the state discrimination signal b changes from high to low, the positive current $I_A$ begins to flow predominantly, indicating that the driving status begins to take place.

On the basis of the judgement results, the inverter frequency is so corrected as to suppress variations in power, thereby ensuring that the positive current $I_A$ and the negative current $I_B$ can flow in predetermined sequence. The power compensator 30 is adapted to correct the variations in power. The power compensator 30 has the regenerating power compensator 16 and the driving power compensator 16. The state discrimination signal b is led to the regenerating power compensator 16 and the driving power compensator 17. The integrator 160 of the regenerating power compensator 16 begins to operate at a time point at which the state discrimination signal b changes from low to high and produces a negative integrated signal which rises with an integration time constant determined by the resistor 16A and capacitor 16C. The polarity of the integrated output signal of the integrator 160 is inverted by the inverting amplifier 161 to produce the regenerating compensation signal $e_1$. As the state discrimination signal b changes from high to low, the integrator 160 begins to discharge with a discharge time constant determined by the resistor 16B and capacitor 16C to fall to zero. On the other hand, the driving power compensator 17 begins to operate when the state discrimination signal b changes from high to low. To prevent simultaneous compensation by both the regenerating power compensator 16 driving power compensator 17, each of the integrator 160 included in the compensator 16 and integrator 170 included in the compensator 17 has its discharge time constant which is selected to be far smaller than its integration time constant. The state discrimination signal b is inverted by the inverter 17A. At a time point at which the state discrimination signal b changes from high to low, the integrator 170 of the driving power compensator 17 begins to operate and produces the negative integrated signal. As the state discrimination signal b changes from low to high, the integrator 170 begins to discharge to fall to zero. The integrator 160 has the integration time constant which is selected to be smaller than that of the integrator 170 for reasons to be described later. The integrated output of the integrator 170 is amplified by the amplifier 171 to produce the negative driving compensation signal $e_2$.

The regenerating compensation signal $e_1$ thus produced from the compensator 16 and the driving compensation signal $e_2$ thus produced from the compensator 17 are added together at the adder 22. The adder 22 provides the power compensation signal e delivered out of the power compensator 30. The power compensation signal e is exemplified in FIG. 6, containing a solid line portion indicative of the regnerating compensation signal $e_1$ produced from the regenerating power compensator 16 and a dotted line portion indicative of the driving compensation signal $e_2$ produced from the driving power compensator 17. As shown in FIG. 6, the positive portion of the power compensation signal e, i.e., the regenerating compensation signal $e_1$ is flattened because the integrator 160 of the regenerating power compensator 16 becomes saturated. In addition, as mentioned previously, the integration time constant of the integrator 160 included in the regenerating power compensator 16 is selected to be smaller than that of the integrator 170 included in the driving power compensator 17. For these reasons, in the power compensation signal e shown in FIG. 6, the positive portion (regenerating compensation signal $e_1$) rises more rapidly than the negative portion (driving compensation signal $e_2$) does. The rising time constant of the regenerating compensation signal $e_1$ is made small for the purpose of limiting this signal $e_1$ by the limit value $i_+$ of the limiter 18. The limitation of the regenerating compensation signal $e_1$ by the limit value $i_+$ is required for making equal the frequency correction signal $\Delta f$ under the occurrence of the regenerating compensation signal $e_1$ and the frequency correction signal $\Delta f$ under the occurrence of the driving compensation signal $e_2$ so that the power compensation for the regenerating status can be made equal to that for the driving status. If it is not possible to make equal the frequency correction signal $\Delta f$ under the occurrence of the regenerating compensation signal $e_1$ and the frequency correction signal $\Delta f$ under the occurrence of the driving compensation signal $e_2$, the suppression of the oscillation can not be expected due to the change of the power to be compensated under the regenerating status and under the driving status. The power compensation signal e of the power compensator 30 is converted, through the limiter 18, into a signal $e_i$ which in turn is supplied to the frequency corrector 19. Reasons for the provision of the limiter 18 will be detailed later. On the basis of the magnitude of the compensation signal $e_i$, the frequency corrector 19 generates the frequency correction signal $\Delta f$, the magnitude of which lies within the range of the rated slip frequency of the motor 12.

The signal $\Delta f$ is added by the adder 20 to the frequency setting signal $f_R$ to thereby provide the frequency command signal $f_1$ for the inverter circuit 11. The frequency setting signal $f_R$ is variable depending on the running speed of the motor 12. The polarity of the frequency correction signal $\Delta f$ is so determined as not to be positive under the occurrence of the regenerating compensation signal $e_1$. The frequency command signal $f_1$ is obtained by adding the correction signal $\Delta f$ to the frequency setting signal $f_R$ during the occurrence of the regenerating compensation signal $e_1$. The time variation of the frequency correction signal $\Delta f$ obtained under the occurrence of the regenerating compensation signal $e_1$ follows the variation in the limit value $i_+$ of the limiter 8, as shown in FIG. 6. When the frequency setting signal $f_R$ is added with the correction signal $\Delta f$, the phase of output voltages of the inverter circuit 11 is advanced relative to the phase of voltages induced in the induction motor 12 only during an interval between times $t_1$ and $t_2$ through which the signal $\Delta f$ increases in the positive direction. With the leading phase of output voltages of the inverter circuit 11 relative to the phase of induced voltages in the motor 12, effective power flows into the motor 12 from the inverter circuit 11 and hence the motor 12 is so controlled as to be increased in speed. When the frequency correction signal $\Delta f$ changes to decrease within the positive region at time $t_2$, the frequency $f_1$ of the inverter circuit 11 is also decreased. When the frequency correction signal $\Delta f$ falls to zero at time $t_3$, the output voltages of the inverter circuit 11 become in phase with the induced voltages in the motor 12. The frequency correction signal $\Delta f$ is decreased within the positive region at a rate which is determined by the discharging time constant of the integrator 160 included in the regenerating power compensator 16.

On the other hand, the frequency correction signal $\Delta f$ becomes negative under the occurrence of the driving compensation signal $e_2$. In this case, the correction signal $\Delta f$ is subtracted from the frequency setting signal $f_R$ to provide the frequency command signal $f_1$. The phase of the output voltages of the inverter circuit 11 is delayed relative to the phase of the induced voltages in the induction motor 12 only when the signal $\Delta f$ increases in the negative direction. With the lagging phase of the output voltages of the inverter circuit 11 relative to the phase of the induced voltages, effective power drawn into the motor 12 from the inverter circuit 11 is decreased. When the frequency correction signal $\Delta f$ is decreased within the negative region at time $t_4$, the frequency $f_1$ of the inverter circuit 11 is increased. When the frequency correction signal $\Delta f$ falls to zero at time $t_5$, the output voltages of the inverter circuit 11 become in phase with the induced voltages in the motor 12. The frequency correction signal $\Delta f$ is decreased within the negative region at a rate which is determined by the discharging time constant of the integrator 170 included in the driving power compensator 17. Thereafter, a similar operation is performed in unstable and quasi-stable regions wherein "1" and "0" are repeated. The frequency correction signal $\Delta f$ takes the form of a DC signal after $t_6$ for reasons to be described below. The occurrence or disappearance of oscillations can be judged only from the repetition of the regenerating status and the driving status. Therefore, it is ambiguously determined whether, at time $t_6$, the flow of the negative current $I_B$ is initiated to bring the driving state into a stable state or the flow of the negative current $I_B$ is initiated under an unstable state like a state at time $t_1$, for example. Thus, the frequency correction signal $\Delta f$ is also changed at time $t_6$ as is done at time $t_1$. Since, in the time chart of FIG. 6, the driving state becomes stable after time $t_6$, oscillations will not occur in the driving status and the state discrimintion signal b will not rise. Consequently, the frequency correction signal $\Delta f$ takes the form of a DC current which is time invariable, and no power compensation is effected. Under this condition, the value of the frequency correction signal $\Delta f$ is limited to the rated slip frequency with the result that the operating frequency of the inverter circuit is simply increased from the value of the frequency setting signal $f_R$ by the rated slip frequency, thus raising no practical problem.

Figure 7:
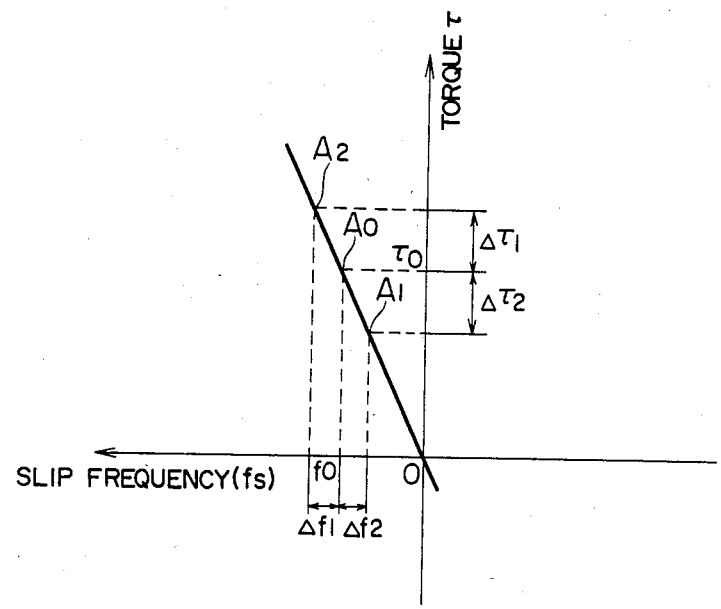
FIG. 7 is a graph showing a torque characteristic of an induction motor.

The inverter circuit 11 is controlled as described thus far. The magnitude of the frequency correction signal $\Delta f$ will now be explained with reference to a torque characteristic shown in FIG. 7. It is now assumed that in FIG. 7, the driving state is stable at a slip frequency $f_o$ under a no load condition at point $A_0$. It is also assumed that the value of the inverter frequency setting signal $f_R$ is changed to cause an oscillatory state. Then, for example, consider that oscillations in the regenerating status take place wherein the negative current component $I_B$ of the inverter DC current increases to decrease the input power to the inverter circuit and the operating point tends to shift from $A_0$ to $A_1$. In this case, the frequency correction signal $\Delta f$ assumes a positive value $\Delta f_2$ which is added to the value of the frequency setting signal $f_R$. As a result, acceleration torque $\Delta \tau_2$ is generated which returns the operating point to the initial point $A_0$.

Next, consider that oscillations in the driving status tend to occur wherein the positive current component $I_A$ of the inverter DC current increases to further increase the input power and the operating point tends to shift from $A_0$ to $A_2$. In this case, the frequency correction signal $\Delta f$ assumes a negative value $\Delta f_1$ which is added to the value of the frequency setting signal $f_R$. As a result, deceleration torque $\Delta \tau_1$ is generated which returns the operating point to the initial point $A_0$. Incidentally, under the oscillatory conditions, power to the motor changes by an amount corresponding to a rated value. It is therefore preferable that the changes in torque $\Delta \tau_1$ and $\Delta \tau_2$ necessary for suppressing the power variation amount to a maximum rated torque. To this end, the frequency correction signal $\Delta f$ is required to vary by an amount corresponding to the rated slip frequency. Therefore, the frequency corrector 19 converts the frequency correction signal $\Delta f$ delivered out of the limiter 18 such that the correction signal $\Delta f$ falls within the range of the rated slip frequency.

As will be seen from the foregoing description, the control apparatus for oscillation suppression is based on the following principle so as to suppress variations in power under the oscillatory conditions. The amount of power compensation P is given by the following equation:

$$P = K_M \cdot J \cdot f_1 \cdot \frac{df_1}{dt} \approx K_M \cdot f_1 \cdot J \cdot \frac{d\Delta f}{dt} \quad (1)$$

where $f_1 = f_R + \Delta f \quad (2)$ and $K_M$ represents a motor constant and J a moment of inertia. The equation (1) is introduced on condition that oscillations occurs under a stationary state wherein a time for determining value of the inverter frequency setting signal $f_R$ is almost negligible, that is, $df_R/dt \approx 0$ stands.

The equation (1) shows that the varying power can be compensated by time varying the frequency correction signal $\Delta f$. At a time point at which the regenerating compensation signal $e_1$ is generated, input power to the motor is decreased to decrease its speed. At this time, the frequency correction signal $\Delta f$ is so controlled as to be positive, so that the input power to the motor is compensated for its increase and reduction in the motor speed can be suppressed. At an instant at which the driving compensation signal $e_1$ is generated, the input power can also be compensated in a similar manner. Under a stable state and under a condition that the load is increased to make the positive current component $I_A$ larger than the negative current component $I_B$, the state discrimination signal b takes the form of a DC current and hence the frequency correction signal $\Delta f$ becomes time invariable, indicating that $d\Delta f/dt$ is zero. When this condition is reached, the power compensation is automatically deactivated. Accordingly, only an unstable supply of power can be compensated.

The operation of the limiter adjusting circuit 40 will now be described. Rotation power under no load (rotation loss) changes with a change in rotation speed of the motor due to a change in the frequency of the inverters and even for the motor driven at the same inverter frequency, it changes with changes in the capacity and the number of poles of the motor. Therefore, it is necessary that the limit values $i+$ and $i-$ be so controlled as to ensure that the amount of power compensation can be optimized by the frequency correction signal $\Delta f$ for suppression of oscillations even when the inverter operating frequency and the capacity and the number of poles of the motor change. To this end, the limit values $i+$ and $i-$ of the limiter 18 is changed by limiter adjusting circuit 40 in proportion to the period of the state discrimination signal b.

This adjustment is based on the fact that as the variation in power increases, the period of the state discrimination signal b becomes longer. In proportion to an increased variation in power, the amount of power compensation must be increased to cancel out the power variation. Thus, the limiter adjusting circuit 40 is configured such that the limit values $i+$ and $i-$ can be automatically changed with the change in the period of the state discrimination signal b to thereby change the value of the frequency correction signal $\Delta f$ automatically.

The limit values $i+$ and $i-$ of the limiter 18 can be varied as will be described with reference to the flow chart of FIG. 6. In this embodiment, based on the fact that cycle of oscillations is repeated in sequence of the regenerating status and the driving status, the limit values are determined in accordance with the initial oscillatory status, i.e., the regenerating status.

Under the oscillatory conditions, the regenerating status and driving status correspond to the high level and low level of the state discrimination signal b, respectively. When the state discrimination signal b rises from low to high at time $t_1$, the reset pulse generator 42 produces a differentiated pulse d. This differentiated pulse d resets the limiter compensator 43 instantaneously and the output signal of the limiter compensator is zeroed. The state discrimination signal b is also led to the sample/hold signal generator 41 to cause it to produce the sample hold signal c. This signal c is delayed, only at the time of the rising of the state discrimination signal b, by an interval of time necessary for the output signal of the limiter compensator 43 to fall to zero, i.e., corresponding to a pulse width of the differentiated pulse d. This delay can afford to ensure that the limiter compensator 43 can steadily be reset in order for its output signal to never fail to start from zero when it receives the sample hold signal c.

When the sample hold signal c of high level is inputted to the limiter compensator 43, the output signal of the limiter compensator 43 is integrated with the same integration time constant as that of the integrator included in the driving power compensator 17. The integrating operation continues until time $t_2$ at which the sample hold signal c changes from high to low. A limit value $i_0$ resulting from this integrating operation continuing until time $t_2$ is held. Holding of the limit value $i_0$ continues until time $t_5$ at which the sample hold signal c changes from low to high. Consequently, the output signal of the driving power compensator which begins to operate at time $t_3$ continues to change to reach a limit value $-i_0$ obtained at time $t_2$. Since the amount of power variation in the regenerating status is substantially equal to the amount of power variation in the driving status, the amount of power compensation effected for the regenerating status must be equal to that effected for the driving status. To this end, the integration time constant of the integrator included in the limiter compensator 43 is selected to be equal to the integration time constant of the integrator included in the driving power compensator 17. Accordingly, the driving compensation signal $e_2$ changes until time $t_4$ at which the limit value $-i_0$ is reached, with the same time constant as that of the regenerating compensation signal $e_1$ obtained between times $t_1$ and $t_2$.

Apparent as described above, each time that the two oscillatory conditions in the regenerating status and the driving status repeat, the limit value is renewed. Consequently, the inverter operating frequency changes to provide the amount of power compensation which is optimized for steady suppression of oscillations even when the oscillatory conditions change. This leads to the fact that the oscillations can be suppressed when the regenerating status and the driving status each repeat only once. The time chart of FIG. 6 shows the renewal procedure of the limit value which is effected each time the period of the state discrimination signal b changes.

Figure 8:
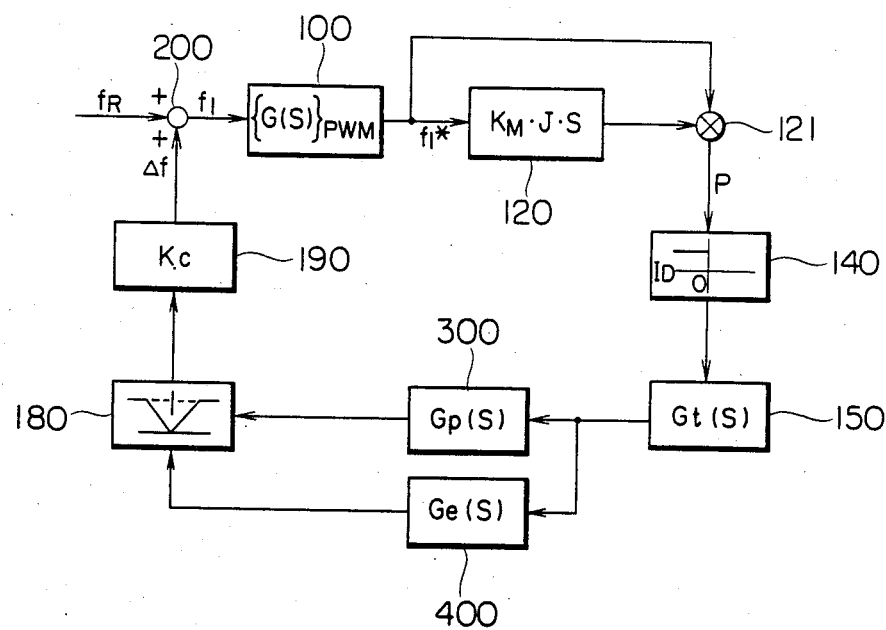
FIG. 8 is a block diagram of an arrangement for providing a transfer function.

FIG. 8 shows the FIG. 1 control apparatus for suppression of oscillations in terms of a transfer function. In this arrangement, a frequency setting signal $f_R$ is added with a frequency correction signal $\Delta f$ at an adder element 200 to provide a signal $f_1$ ($=f_R+\Delta f$), the signal $f_1$ is applied to a transfer element 100 standing for the PWM inverter circuit, and a frequency $f_1^*$ outputted from the element 100 is passed through a differentiating element 120 and a multiplier element 121 so as to control rotation power P of an induction motor. As will be seen from the equation (1), the rotation power compensation continues until the frequency correction signal $\Delta f$ does not vary with time ($d\Delta f/dt=0$). For deriving the frequency correction signal $\Delta f$ from the rotation power P, the oscillation suppression compensation element comprises an element 140 (corresponding to detector 14 in FIG. 1) for judging a power flow direction from the polarity of the inverter input current, an element 150 (corresponding to discriminator 15 in FIG. 1) for detecting variations in the power flow direction, an element 300 (corresponding to power compensator 30 in FIG. 1) for compensating power in accordance with the variations in the power flow direction, an element 180 (corresponding to limiter 18 in FIG. 1) for converting a power compensation signal delivered out of the element 300 into a proper value, an element 190 (corresponding to cirrector 19 in FIG. 1), and a limiter compensator element 400.

Figure 9:
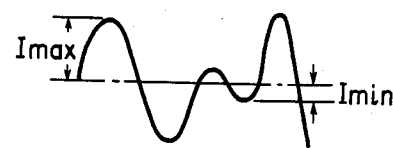
FIG. 9 is a waveform diagram of an output current of the PWM inverter.

The elements 150, 300 and 400 have transfer functions Gt(s), Gp(s) and Gl(s), respectively, and characteristics of these transfer functions will be described by using a current stability as defined by the following equation in respect of the inverter output current under oscillatory conditions as shown in FIG. 9.

$$\text{Current stability} = I_{min}/I_{max} \quad (3)$$

where
$I_{min}$: minimum value of primary current amplitude under oscillatory conditions,
$I_{max}$: maximum value of primary current amplitude under oscillatory conditions.

Figure 10:
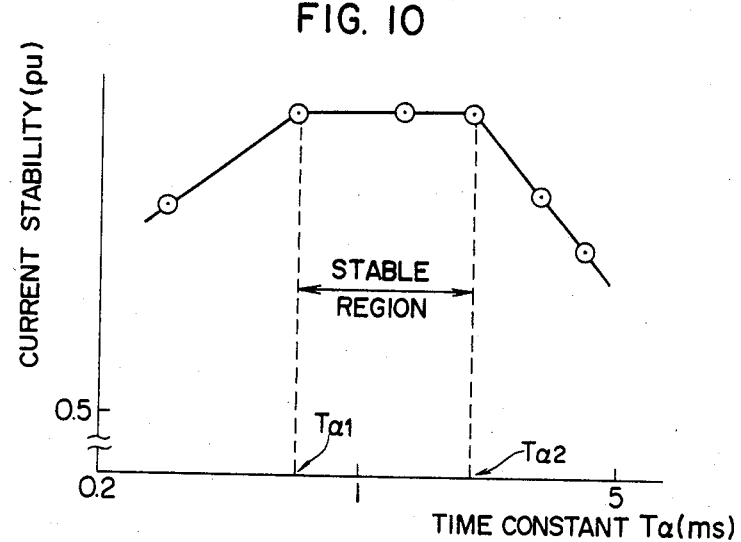
FIGS. 10 to 12 are graphic representations showing characteristics of various transfer functions.

FIG. 10 shows a characteristic of the transfer function Gt(s) which is given by the following equation describing a stable region at about 1 (one) of the current stability.

$$Gt(s) = \frac{(T_{d1} \cdot s)^{-1}}{1 + (T_{d1} \cdot s)^{-1}} \cdot \frac{1}{1 + (T_{d2} \cdot s)^{-1}} \quad (4)$$

(s: Laplace operator)

Experimentally, constants $T_{d1}$ and $T_{d2}$ are conditioned as follows:

$$T_c/2 \leq T_{d1} \leq T_{d2} \leq 3T_c \quad (5)$$

($T_c$: period of carrier wave).

Figure 11:
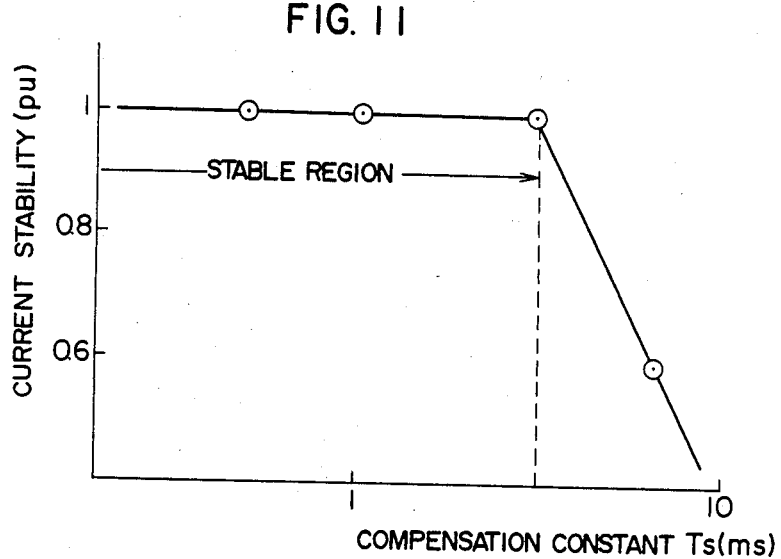

FIG. 11 shows a characteristic of a transfer function ($G'_p(s)$) of the driving power compensator which is given by, $$G'_p(s) = \frac{1}{1 + (T_s \cdot s)^{-1}}. \quad (6)$$

Experimentally, an allowable condition for a compensation constant $T'_s$ in equation (6) is indicated by, $$T_c \leq T'_s \leq 5T_c \quad (7).$$

The transfer function Gl(s) of the limiter compensator 43 is selected to be equal to the transfer function $G'_p(s)$ of the driving power compensator in order that under oscillatory conditions, the same power compensation can be effected for the driving status and the regenerating status.

$$Gl(s) = \frac{1}{1 + (T_s \cdot s)^{-1}} = G'_p(s) \quad (8)$$

Figure 12:
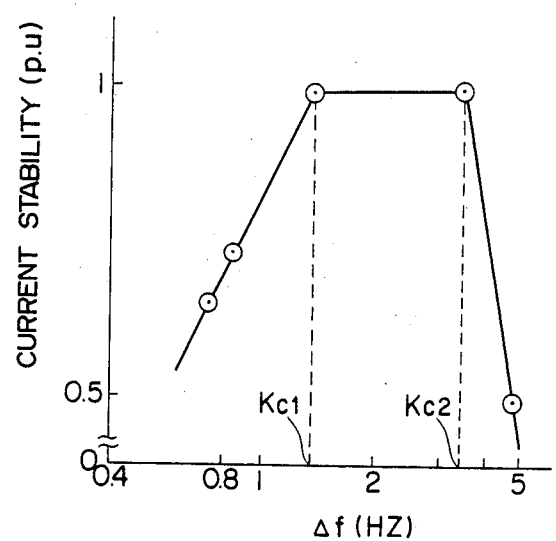
Figure 13:
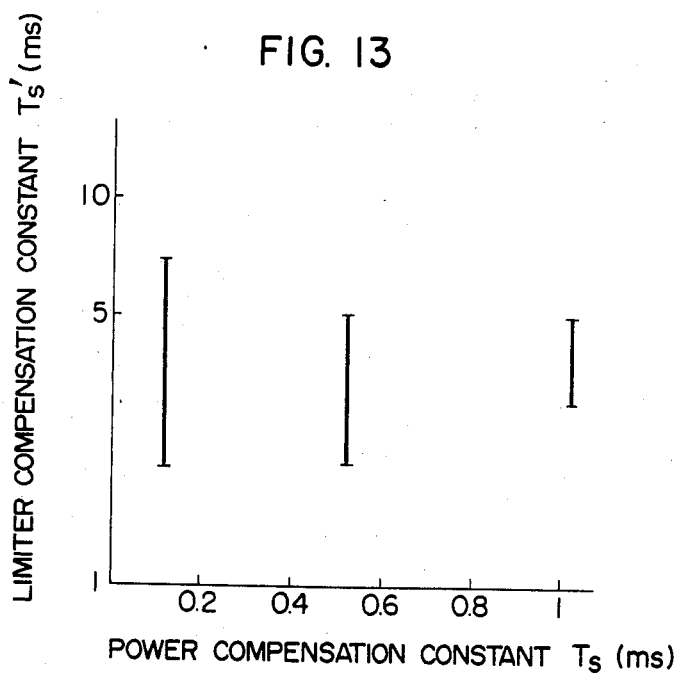
FIG. 13 is a graph showing a characteristic of compensation constant.

A transfer function $G''_p(s)$ of the regenerating power compensator is identical to that of equation (6) or (8) with the only exception that time constant $T_s$ is different. FIG. 12 illustrates the relation between $T_s$ and $T'_s$ which is required for realizing a stable compensation system. This relation slightly changes with the value of $T_s$ but is sufficient to provide the following condition:

$$T'_s \approx 4T_s \quad (9)$$

Equation (9) shows that the automatic limiter compensation operation is slower than the regenerating power compensation operation. Therefore, within the range of regenerating power compensation, the frequency correction signal $\Delta f$ is always controlled by the automatic limiter compensation system. Within the range of driving power compensation, on the other hand, the automatic limiter compensation system does not operate but produces a fixed limit value, and a compensation constant equivalent to $T'_s$ is applied to this range. Thus, the regenerating power compensation and the driving power compensation can be effected by the same amount of power, thereby ensuring balanced compensation and consequent exact suppression of oscillations.

As described above, the foregoing embodiments of the invention can constantly provide the amount of power compensation capable of cancelling out variations in power even when the driving conditions of the motor change and hence the oscillatory conditions change, and therefore can suppress the oscillations irrespective of type and capacity of the motor. In addition, since the suppression of oscillations in this control apparatus does not depend on detection of the magnitude of current, there is no need of exchanging the current detector, depending on capacity of the inverters and this apparatus can be applied various inverters which are different in capacity.

As has been described, the control apparatus according to this invention judges the stable state wherein the flowing periods of the positive and negative current components of the DC current flowing in the input side of the PWM inverter circuit when the PWM inverter circuit is switched lie within the predetermined period, and the unstable state wherein the flowing periods does not lie within the predetermined period, and in the event of the unstable state, determines the frequency correction signal at the rate of the predetermined period so as to compensate power on the pasis of the frequency correction signal. With this construction, the exact amount of power compensation can constantly be obtained even when the driving conditions of the motor change, and the oscillations can be suppressed irrespective of capacity and type of the motor and loading on the motor.

The invention has been described by way of the induction motor but teachings of the invention can be applied to suppression of oscillations in a synchronous motor. In such an application, the operating range of the frequency correction signal can be set to several percents of the value of inverter frequency setting signal. The PWM inverter circuit has been exemplified as comprising power switching elements in the form of power transistors but the power switching elements may be constituted by gate turn-off (GTO) transistors, power MOS FETs or thyristors. The oscillation suppressing control circuit constituted by analog operation devices such as operational amplifiers in the foregoing embodiments may otherwise be constitutied by using a microcomputer.

We claim:

1. A method for controlling a PWM inverter circuit responsive to a pulse width modulated signal resulting from comparison of a carrier wave signal with a sine wave modulation signal having a frequency proportional to a frequency setting signal to drive an AC motor, said method comprising the steps of:
   detecting positive and negative components of a DC current flowing in the input side of said PWM inverter circuit; and
   correcting said frequency setting signal such that said positive and negative components occur alternately within one period of said carrier wave signal.

2. A controlling method according to claim 1 wherein the amount of correction of said frequency setting signal increases in proportion to the magnitude of said frequency setting signal.

3. A controlling method according to claim 1 wherein said frequency setting signal is so corrected as to be increased when only the negative current component flows over an interval of time which exceeds said one period of said carrier wave signal, and said frequency setting signal is so controlled as to be decreased when only the positive current component flows over an interval of time which exceeds said one period.

4. A controlling method according to claim 1 wherein said frequency setting signal is corrected at a predetermined rate of change.

5. A controlling method according to claim 1 wherein the amount of correction of said frequency setting signal is determined in proportion to an interval of time through which only the positive current component or the negative current component flows in excess of said one period of said carrier wave signal.

6. An apparatus for controlling a PWM inverter circuit adapted to drive an AC motor comprising:
   modulation signal generator means for comparing a carrier wave signal and a sine wave modulation signal having a frequency proportional to a frequency setting signal and producing a pulse width modulation signal for controlling said PWM inverter circuit;
   current polarity detector means for detecting positive and negative components of a DC current flowing in the input side of said PWM inverter circuit;
   state discriminator means for discriminating an oscillatory condition of said motor when only the positive current component or the negative current component flows over an interval of time which exceeds one period of said carrier wave signal;
   power compensator means for producing a power compensation signal when said state discriminator means discriminates the oscillatory condition; and
   frequency corrector means, responsive to said power compensation signal, for correcting said frequency setting signal.

7. A controlling apparatus according to claim 6 wherein said power compensator means comprises regenerating power compensator means for producing a regenerating compensation signal and driving power compensator means for producing a driving compensation signal.

8. A controlling apparatus according to claim 6 wherein said frequency corrector means includes a limiter for limiting the magnitude of said power compensation signal.

9. A controlling apparatus according to claim 6 wherein said power compensator means produces a power compensation signal which changes at a predetermined rate of change when a regenerating status and a driving status occur.

10. A controlling apparatus according to claim 8 wherein said frequency corrector means includes a limiter adjusting circuit for changing the limit value of said limiter in proportion to a period of a state discrimination signal delivered out of said state discriminator means.

* * * * *